U. G. SPEED.
BREAST COLLAR.
APPLICATION FILED DEC. 13, 1913.
1,148,632. Patented Aug. 3, 1915.
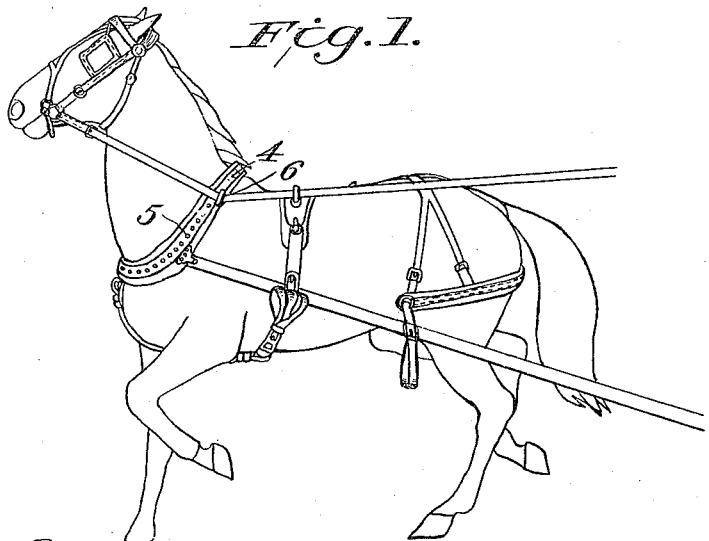
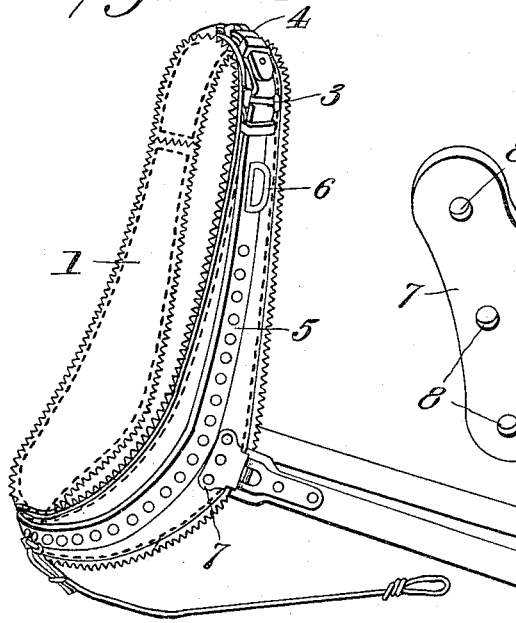
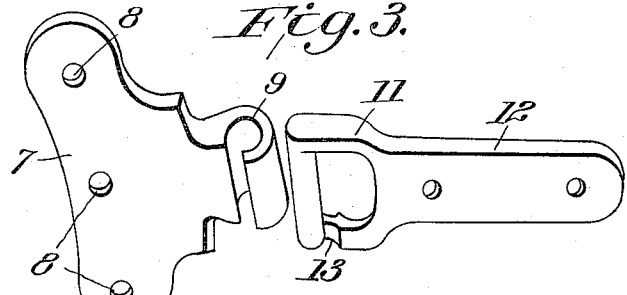
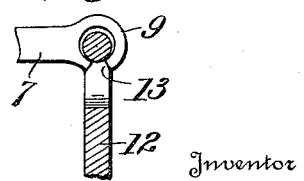
Witnesses
C. H. Walker
J. R. Mansfield
Inventor
Uriah G. Speed
By James DuShane
Attorney

UNITED STATES PATENT OFFICE.

URIAH G. SPEED, OF SOUTH BEND, INDIANA.

BREAST-COLLAR.

1,148,632.  Specification of Letters Patent.  Patented Aug. 3, 1915.

Application filed December 13, 1913. Serial No. 806,452.

*To all whom it may concern:*

Be it known that I, URIAH G. SPEED, citizen of the United States, residing at South Bend, in the county of St. Joseph and State of Indiana, have invented certain new and useful Improvements in Breast-Collars, of which the following is a specification.

My invention relates to harness, and more particularly to breast collars.

The object of my invention is to produce a horse collar adapted to fit the shoulders of the animal upon which it is arranged and to accommodate itself to the movements of the shoulders so as to avoid chafing, galling and other inconveniences to the animal arising from the use of stiff, hard and ill-fitting collars.

Furthermore, the object of my invention is to produce a collar having a foundation piece of heavy felt. The felt, coming in contact with the animal upon which it is used, provides a soft and pliable pad upon which I secure a leather covering piece and which is also provided with a suitable central strengthening member, extending centrally the entire length of the collar.

Furthermore, the object of my invention is to provide a collar having suitably attached thereto hame-tug attachments or a connecting device to which the forward end of the trace may be easily and quickly secured.

Finally, the object of my invention is to produce a collar which will possess advantages in points of efficiency and durability, proving at the same time comparatively inexpensive to manufacture.

With the foregoing and other objects in view the invention consists in the details of construction and in the arrangement and combination of parts to be hereinafter more fully set forth and particularly pointed out in the claims.

In describing the invention in detail, reference will be made to the accompanying drawing, forming a part of this specification, wherein like characters denote corresponding parts in the several views, and in which:—

Figure 1 is a perspective view of a horse provided with my improved collar. Fig. 2 is a perspective view of my improved breast collar. Fig. 3 is a perspective view of the trace connection. Fig. 4 is a sectional view of the trace connection showing the position for connecting the same.

In the drawings, 1 indicates a felt pad which is in outline approximately the contour of the horse's shoulder and around the edges of which I provide a serrated edge. The felt piece is made in one continuous piece so that it may extend from the upper portion of the shoulder entirely around beneath the neck and be connected with the opposite end, over the neck of the horse in a manner similar to the ordinary collar.

On the felt piece, 1, I secure by suitable stitching, a leather covering piece, 2, approximately the same width and length of the felt piece but which does not extend over, or entirely cover up, the serrated edges of the felt piece and by this arrangement a very neat and attractive finish is provided for the collar.

To the leather piece, 2, at each end thereof, I secure loops, 3, to which a strap, 4, is suitably secured at each end, thus providing means for adjusting the size of the collar. A second reinforced strap, 5, of leather is secured upon the leather covering piece, 2, and extends centrally the entire length of the collar but is approximately only one-half the width of the leather covering piece, 2.

The usual rein rings, 6, are secured upon each side of the collar in any suitable manner to support the reins.

The hame-tug attachments comprise a flat metal plate, 7, having apertures, 8, through which rivets extend for securing the same to the collar. I also provide the plate, 7, with a hook, 9, formed integrally therewith and which engages with an eye, 11, formed integrally with a plate, 12. The eye-shaped member, 11, is provided at one side with a thin portion, 13, not as great in thickness as the other portions of said member. This provides means by which the eye-shaped member can be easily and readily inserted in the hook, 9, of the other member which is attached to the collar. It also prevents the trace from becoming accidentally disengaged, it being necessary to bring the eye-shaped member almost perpendicular with the other member, and to the upper edge thereof, before the eye will enter the hook shaped portion of the plate, 7.

The usual martingale rings and attachments may be secured to the lower central portion of my improved collar in the usual manner, the appearance of the collar being neat and adapted to fit closely the contour of the shoulder of the animal upon which it is arranged. It will be observed, that a collar is provided which is flexible throughout, so that it will automatically conform to the shoulders and necks of different animals, and by extending the main layers continuously around the lower-side and reinforcing the same with a flexible means or strap, which also extends continuously of the sides and lower-portion of said layers, the collar is reinforced against bursting strains caused by the loads pulling back on the shoulders of the animal. Furthermore, by securing the reinforcing strap centrally of the collar layers, provides free flexible edges around the collar which accommodate themselves to the shape of the neck and shoulders.

It is believed that from the foregoing description the construction of my improved collar can be fully understood, it being noted that various changes in the size and proportions of the same may be made without departing from the spirit of the invention.

Having fully described my invention, what I claim as new and desire to secure by Letters Patent is:—

1. A breast collar, comprising a layer of felt and a layer of leather secured together in close contact throughout their areas and extending continuously from one end to the other, forming two free ends at the top and a closed portion at the bottom of the collar, a flexible reinforcing means secured centrally upon said leather layer and also extended continuously around the sides and bottom of said collar, and means at the top of the collar for securing the two free ends together.

2. A breast collar, comprising a layer of felt and a layer of leather secured together in close contact throughout their areas and extending continuously from one end to the other, forming two free ends at the top and a closed portion at the bottom of the collar, a leather reinforcing strap secured centrally upon said leather layer and also extended continuously around the sides and bottom of said collar, and means at the top of the collar for securing the two free ends together.

3. A breast collar, comprising a felt member which is adapted to extend continuously around the neck of an animal, a leather covering secured directly to said felt member and approximately of the same width and length of said felt member, to cover and contact with its entire area, a leather reinforcing strap of less width than said leather covering and secured directly to and centrally thereof substantially entirely around the collar, and means at the top of the collar for securing its ends together.

In testimony whereof I affix my signature in presence of two witnesses.

URIAH G. SPEED.

Witnesses:
JOHN F. COTTER,
ROBERT C. PORTER.

Copies of this patent may be obtained for five cents each, by addressing the "Commissioner of Patents. Washington, D. C."